(12) United States Patent
Rutt et al.

(10) Patent No.: US 7,207,224 B2
(45) Date of Patent: Apr. 24, 2007

(54) WIDE-RANGE COMBINATION VACUUM GAUGE

(75) Inventors: Paul M. Rutt, Longmont, CO (US); Michael D. Borenstein, Boulder, CO (US)

(73) Assignee: Brooks Automation, Inc., Chelmsford, MA (US)

( * ) Notice: Subject to any disclaimer, the term of this patent is extended or adjusted under 35 U.S.C. 154(b) by 141 days.

(21) Appl. No.: 11/150,868

(22) Filed: Jun. 10, 2005

(65) Prior Publication Data

US 2006/0278004 A1    Dec. 14, 2006

(51) Int. Cl.
*G01L 7/00* (2006.01)

(52) U.S. Cl. .............. 73/714; 73/23.27; 73/23.29; 73/31.04

(58) Field of Classification Search .......... 73/714, 73/23.27, 23.29, 31.04
See application file for complete search history.

(56) References Cited

U.S. PATENT DOCUMENTS

| 2,503,372 | A | * | 4/1950 | Bagley ........................ 73/714 |
| 3,064,478 | A |   | 11/1962 | Schafer |
| 3,580,075 | A |   | 5/1971 | Steinberg |
| 3,610,922 | A |   | 10/1971 | Werner |
| 4,556,807 | A |   | 12/1985 | Yamada et al. |
| 4,689,999 | A |   | 9/1987 | Shkedi |
| 4,747,311 | A |   | 5/1988 | Hojoh |
| 4,752,141 | A |   | 6/1988 | Sun et al. |
| 4,755,669 | A |   | 7/1988 | Grant et al. |
| 4,866,640 | A |   | 9/1989 | Morrison Jr. |
| 4,995,264 | A |   | 2/1991 | Stocker et al. |
| 5,024,100 | A |   | 6/1991 | Weinstein |
| 5,373,240 | A |   | 12/1994 | Guenter |
| 5,452,613 | A |   | 9/1995 | Bills et al. |
| 5,583,297 | A |   | 12/1996 | Stocker et al. |
| 5,606,516 | A |   | 2/1997 | Douglas et al. |
| 5,939,639 | A | * | 8/1999 | Lethbridge ................... 73/724 |
| 6,023,979 | A |   | 2/2000 | Bills et al. |

(Continued)

FOREIGN PATENT DOCUMENTS

EP    1 203 212 B1    3/2005

(Continued)

OTHER PUBLICATIONS

Installation Guide: Setra Systems Model 264 Differential Pressure Transducer, Setra, 159 Swanson Road, Boxborough, MA 01719.

(Continued)

*Primary Examiner*—Michael Cygan
*Assistant Examiner*—Andre Allen
(74) *Attorney, Agent, or Firm*—Hamilton, Brook, Smith & Reynolds, P.C.

(57) ABSTRACT

A combination vacuum gauge provides simultaneous absolute and differential pressure measurements over a wide range of pressures ranging from atmospheric pressures to ultrahigh vacuum by processing the readings from an absolute high vacuum gauge (e.g., an ionization gauge and/or a heat-loss sensor), a differential low vacuum gauge providing a differential relative to ambient pressure (e.g., a diaphragm sensor), and a barometric absolute pressure sensor exposed to the ambient atmosphere outside the measurement region. The barometric absolute pressure sensor reading is used to convert the differential vacuum gauge reading from uncalibrated differential pressure to calibrated absolute pressure.

17 Claims, 5 Drawing Sheets

U.S. PATENT DOCUMENTS

| | | |
|---|---|---|
| 6,046,456 A | 4/2000 | Bills |
| 6,081,121 A | 6/2000 | Bills |
| 6,198,105 B1 | 3/2001 | Bills |
| 6,227,056 B1 | 5/2001 | Bills et al. |
| 6,272,928 B1 | 8/2001 | Kurtz |
| 6,473,711 B1 | 10/2002 | Sittler et al. |
| 6,515,482 B2 | 2/2003 | Kawasaki |
| 6,909,975 B2 | 6/2005 | Dozoretz et al. |
| 2001/0011890 A1 | 8/2001 | Kawasaki |
| 2002/0186017 A1 | 12/2002 | Liebeskind |
| 2006/0123915 A1* | 6/2006 | Arnold et al. .......... 73/708 |

FOREIGN PATENT DOCUMENTS

| | | |
|---|---|---|
| WO | WO 89/01615 | 2/1989 |
| WO | WO 01/13083 A1 | 2/2001 |

OTHER PUBLICATIONS

MKS Releases New Pressure/Vacuum Transducer, MKS Instruments, downloaded from http://www.mksinst.com/PRhps901.html, Mar. 22, 2005.

* cited by examiner

US 7,207,224 B2

WIDE-RANGE COMBINATION VACUUM GAUGE

BACKGROUND OF THE INVENTION

In many industries certain processes require pressure measurements over a wide range from about 1000 Torr to less than $10^{-9}$ Torr. For example, some semiconductor and electronic device manufacturing processes require accurate pressure measurements from ultrahigh vacuum to atmospheric pressures. To achieve the wide-range pressure measurement requirements of industry, there has been a recent movement to combine vacuum gauges having different pressure measurement ranges into a single product. These products typically include at least two different physical means for measuring pressure in a given environment.

In some applications it is necessary not only to measure pressures over a wide range, but also to measure absolute and differential pressure simultaneously. For example, in certain applications, the pressure inside a chamber must be slightly greater than the pressure outside the chamber. Otherwise, if the pressure inside the chamber were less than the pressure outside the chamber and the chamber door were opened, then contaminants could enter the chamber. Also, if the pressure inside a chamber were much greater than the pressure outside the chamber and the chamber door were opened, then turbulence could damage the product being processed. In order to achieve the slight pressure differential between the inside and the outside of the chamber, it is necessary to obtain accurate differential pressure measurements.

SUMMARY OF THE INVENTION

There is a need for a combination vacuum gauge that provides accurate absolute and differential pressure measurements over a wide range of pressures extending from ultrahigh vacuum to atmospheric pressures. The combination vacuum gauge presented herein fulfills this need by combining an absolute high vacuum gauge (e.g., a heat-loss sensor), a differential low vacuum gauge providing a differential relative to ambient pressure (e.g., a diaphragm sensor), and a barometric absolute pressure sensor exposed to the ambient atmosphere outside the measurement region. A processor coupled to the absolute high vacuum gauge, the differential low vacuum gauge, and the barometric absolute pressure gauge provides absolute gas pressure indications in the ranges of high and low vacuum and differential gas pressure indications at low vacuum.

The processor converts the differential vacuum gauge reading from uncalibrated differential pressure to calibrated absolute pressure. The differential vacuum gauge reading may be converted from uncalibrated differential pressure to calibrated absolute pressure according to the following formula:

$$P_{abs}=P_{barometric}+K(P_{diff}-A) \text{ where}$$

$P_{barometric}$=data output from the barometric absolute pressure sensor (calibrated knowing actual absolute ambient pressure);

$P_{diff}$=data output from the differential low vacuum gauge;

$A$=zero offset error of the differential low vacuum gauge; and $$K=-P_{barometric}/(P_{diff}-A) \text{ at vacuum } (P_{abs}=\sim 0).$$

The data outputs from the absolute high vacuum gauge and the differential low vacuum gauge may overlap. The combination vacuum gauge may also include an absolute ultrahigh vacuum gauge, such as an ionization gauge.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

A description of preferred embodiments of the invention follows.

Figure 1:
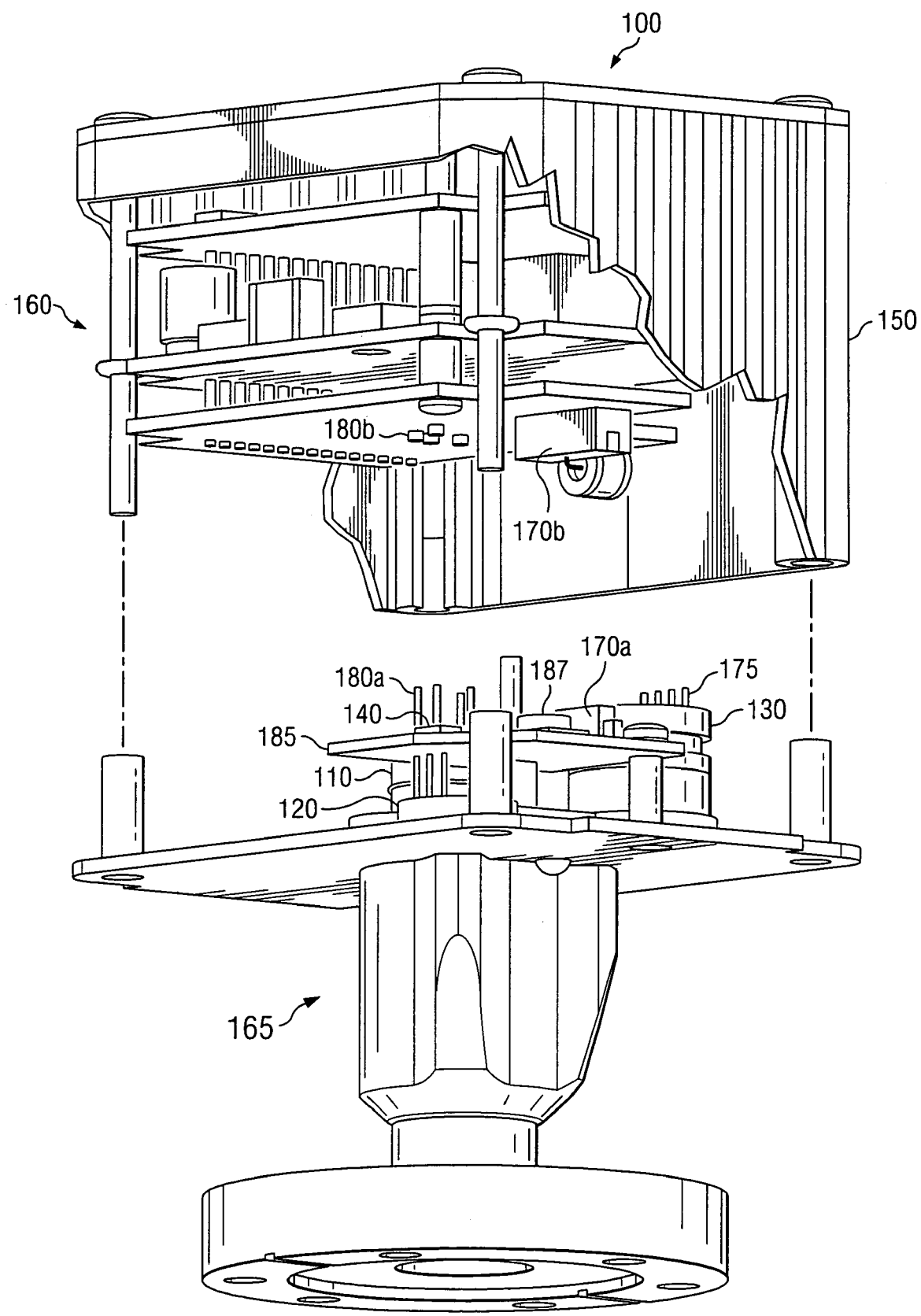
FIG. 1 is a perspective view of a combination vacuum gauge separated from the control electronics and cover, with the cover partially broken away.

Referring to FIG. 1, a combination vacuum gauge system 100 in accordance with the present invention comprises a combination vacuum gauge 165 and controller electronics 160. The combination vacuum gauge 165 includes an ionization gauge 110, a heat-loss sensor 120, a differential diaphragm sensor 130 capable of measuring the pressure differential between a measurement region and ambient atmosphere, a barometric pressure sensor 187, and nonvolatile memory 140. The ionization gauge 110 may be a Bayard-Albert-type ionization gauge which is useful from below $10^{-9}$ Torr to 0.02 Torr. The heat-loss sensor 120 may be a Pirani or convection-enhanced Pirani heat-loss transducer which is useful from 0.002 Torr to 50 Torr. The differential diaphragm sensor 130 is useful from a difference of 4 Torr to 1 atmosphere and the barometric pressure sensor 187 is useful from about 600 Torr to 800 Torr.

The ionization gauge 110 electrically connects to the controller electronics 160 through pins 180a and sockets 180b. The heat-loss sensor 120, the nonvolatile memory 140, and the barometric pressure sensor 187 are connected to a combination vacuum gauge circuit board 185 which in turn connects to the controller electronics 160 through connectors 170a and 170b. The differential diaphragm sensor 130 electrically connects to the controller electronics 160 through pins 175 and a flex cable (not shown) to the connectors 170a and 170b. The controller electronics 160, when connected to the combination vacuum gauge 165, are enclosed within a housing 150.

Figure 2A:
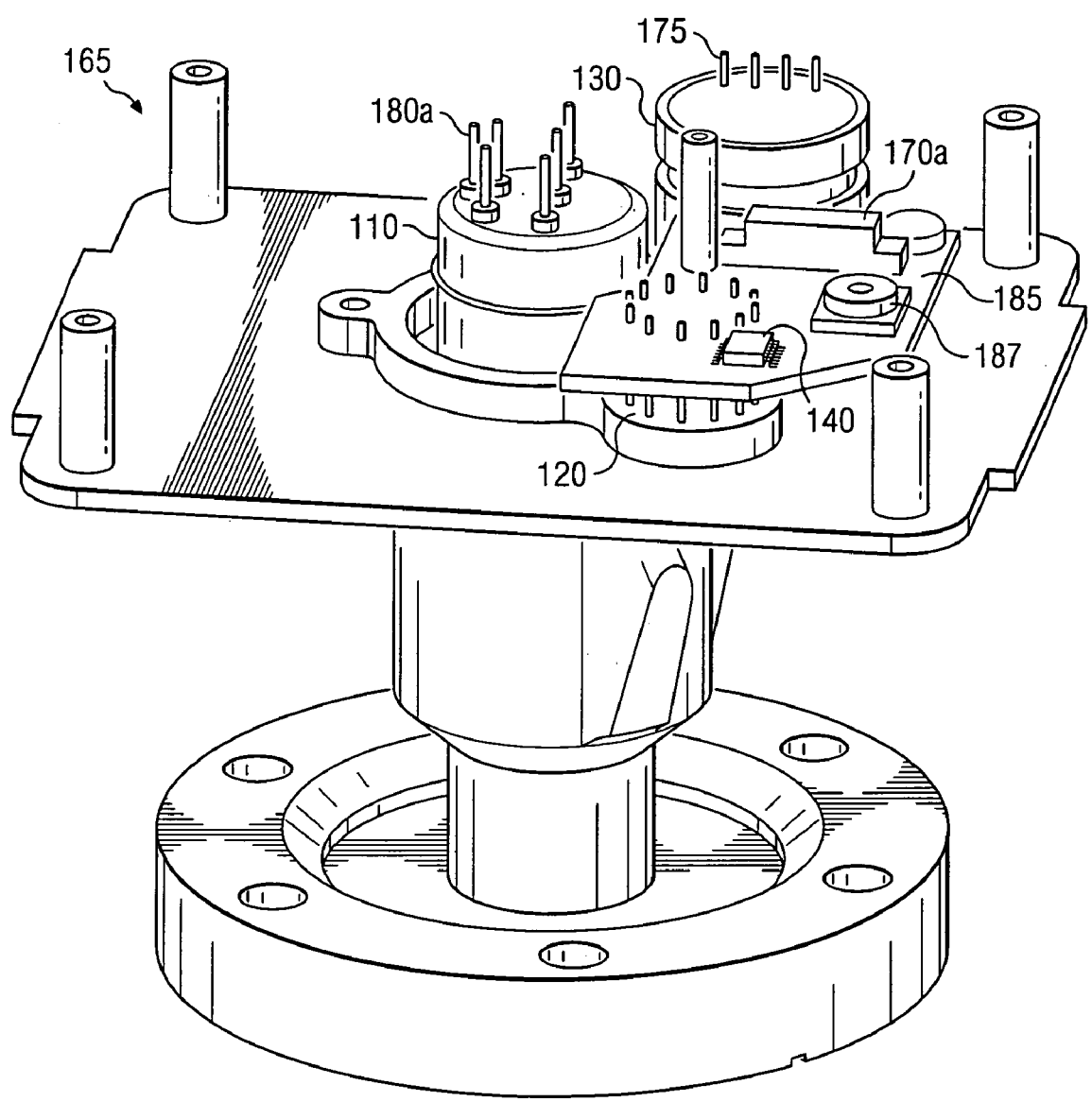
FIG. 2A is a perspective view of the combination vacuum gauge of FIG. 1.

FIG. 2A shows a perspective view of the combination vacuum gauge 165 that includes the ionization gauge 110 having six pins 180a, the differential diaphragm sensor 130 having four pins 175, the heat-loss sensor 120, the barometric pressure sensor 187, the nonvolatile memory 140, and the combination vacuum gauge circuit board 185 having the connector 170a. In another embodiment, nonvolatile memory 140 may be permanently affixed to each of the sensors 110, 120, 130 and 187. The nonvolatile memory 140 may be any Non-Volatile Random Access Memory (NVRAM) such as Electrically Erasable Programmable Read-Only Memory (EEPROM).

The nonvolatile memory 140 may contain calibration parameters unique to each of the sensors 110, 120, 130 and 187 as disclosed in U.S. patent application Ser. No. 11/012, 871. The calibration parameters may be determined based on factory calibration of each of the individual sensors 110, 120, 130 and 187 (the barometric pressure sensor 187 may be calibrated by knowing the current absolute barometric pressure). By storing the calibration on the combination vacuum gauge 165 rather than in the controller electronics 160, the combination vacuum gauge 165 can be replaced in the field without replacement of the controller electronics 160. An alternative approach is to plug the nonvolatile memory 140 into the controller electronics 160 but to replace that memory as the combination vacuum gauge is replaced.

Figure 2B:
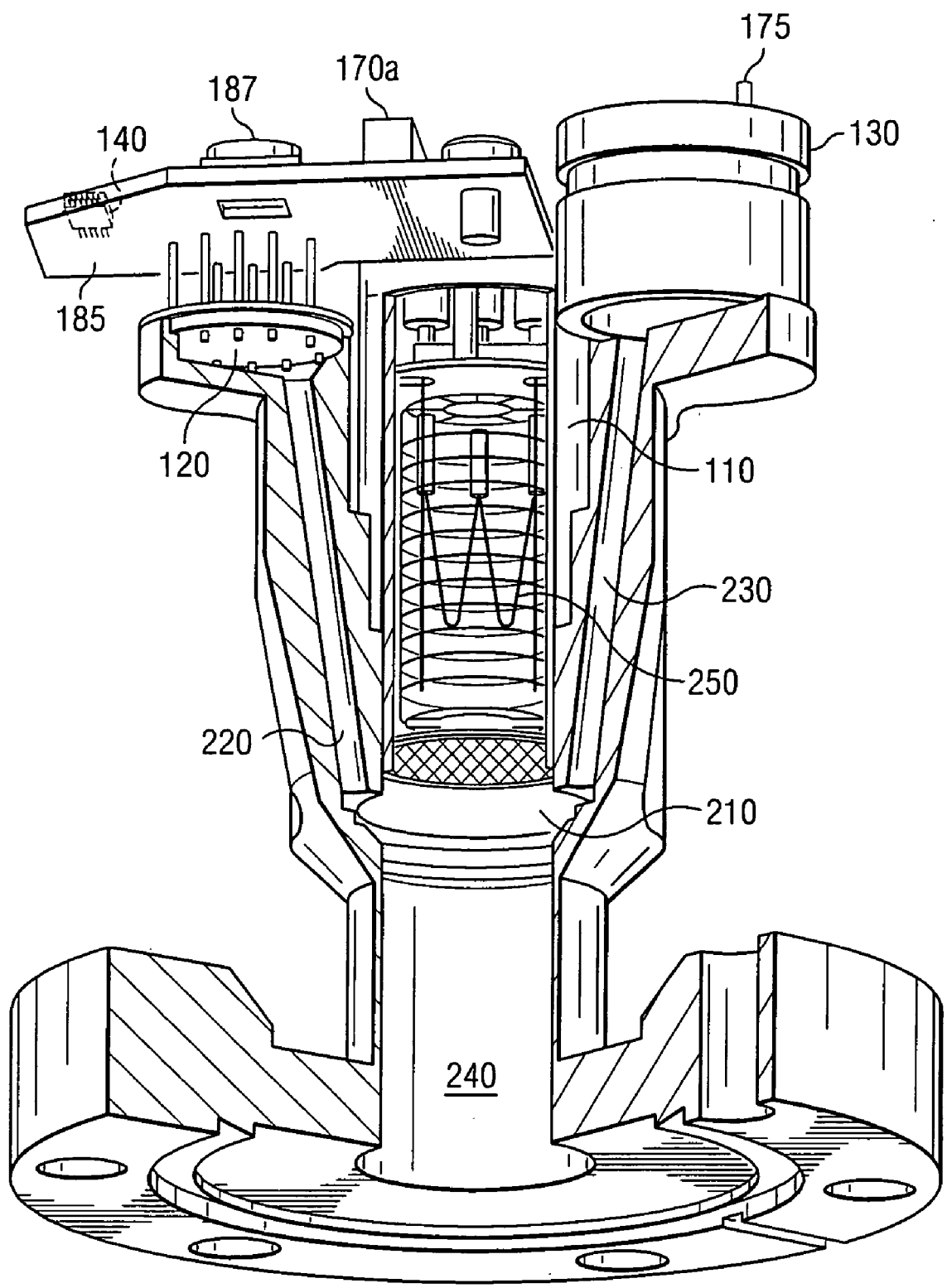
FIG. 2B is a sectional view of the combination vacuum gauge of FIG. 1.

FIG. 2B illustrates a sectional view of the combination vacuum gauge 165. The sensors 110, 120 and 130 together measure the pressure of a measurement region having pressures ranging from about atmospheric pressure (about 1,000 Torr) to ultrahigh vacuum (e.g., less than $10^{-9}$ Torr). The sensors connect with the measurement region through respective ports 210, 220, 230 and a common gauge port 240. The barometric pressure sensor 187, which may be a diaphragm sensor, however, does not measure the pressure of the measurement region, but measures the atmospheric pressure outside of this region. Thus, the barometric pressure sensor 187 is placed on the combination vacuum gauge circuit board 185 where it is exposed to the environment outside of the measurement region.

As described above, often a non-species dependent measurement of the difference between the pressures inside and outside of a vacuum chamber is required to prevent damage or contamination of material that is passed into or out of a vacuum chamber for processing. This measurement may be obtained with a differential diaphragm sensor with one side of the diaphragm exposed to the ambient room atmosphere and the other side exposed to the vacuum chamber. Measuring this differential pressure directly rather than measuring two absolute pressures and computing the difference prevents error build-up due to additive tolerances.

Since the diaphragm sensor is integrated into a full-range combination vacuum gauge, there is a strong desire to obtain a composite pressure output that spans 12 or more decades of absolute pressure up to atmospheric pressure. Traditionally the reading from an additional absolute diaphragm gauge compatible with ultrahigh vacuum would be combined with other absolute readings to obtain full-range absolute pressure measurements. However, it is expensive to construct an absolute diaphragm sensor because the sensor structure must be sealed and pumped down to vacuum.

Instead, the combination vacuum gauge of the present invention uses a relatively inexpensive absolute transducer with a narrow range to sense atmospheric pressure. This absolute transducer does not need to be compatible with high vacuum or the vacuum processes because it is not exposed to the inside of the chamber. The absolute transducer is positioned at any location where it is exposed to the ambient atmosphere outside of the chamber or measurement region. As described further herein, the reading from the absolute transducer is combined with the reading from the differential diaphragm sensor to obtain an absolute reading. This absolute reading is then combined with readings from high vacuum gauges to obtain a composite absolute pressure measurement from ultrahigh vacuum to atmospheric pressures without the use of an expensive absolute diaphragm sensor.

Figure 3:
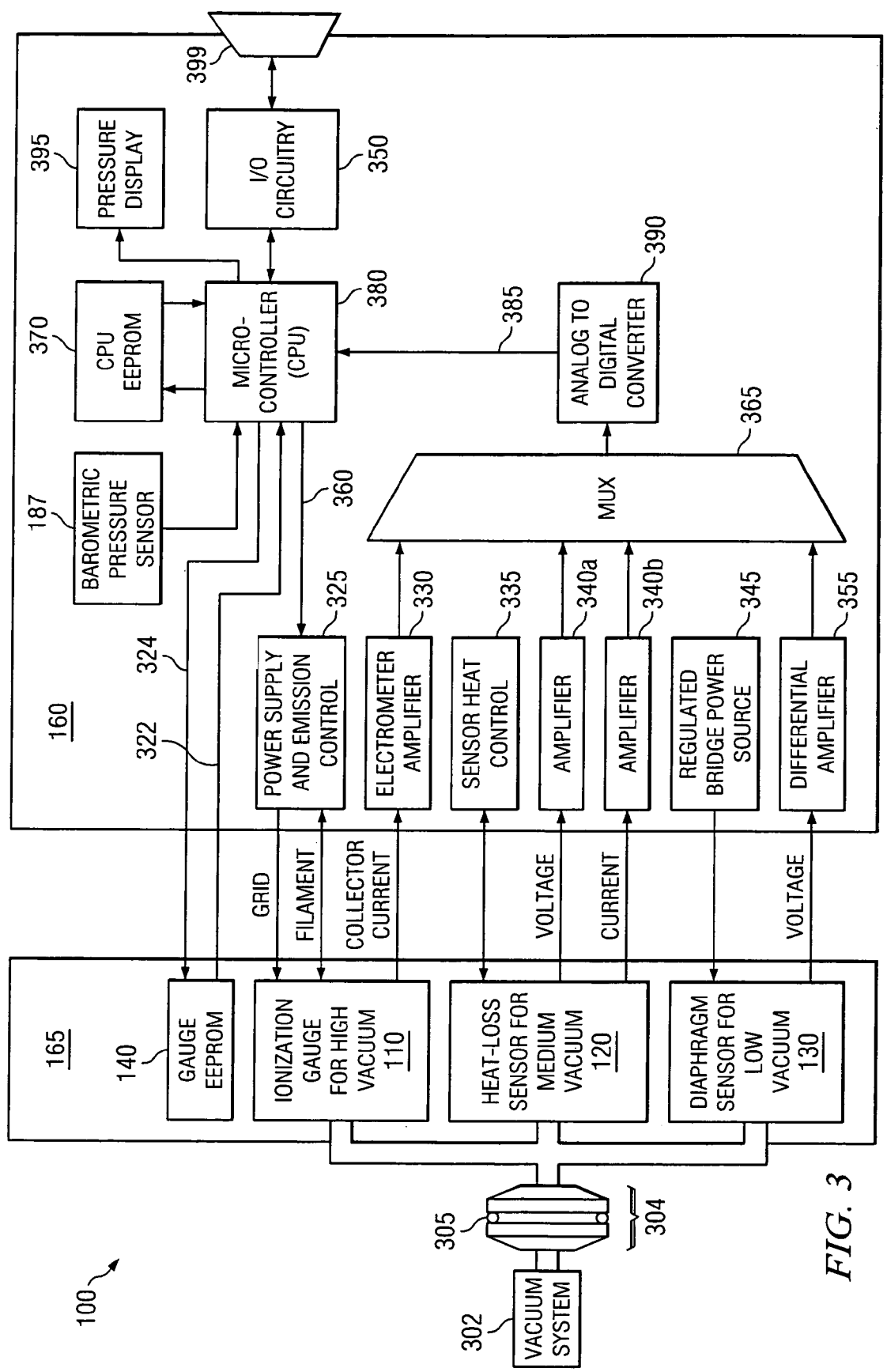
FIG. 3 is a block diagram of the combination vacuum gauge system with control electronics.

Referring to FIG. 3, controller electronics 160 connect to the combination vacuum gauge 165 via pin and socket connections. The combination vacuum gauge 165 in turn connects to the vacuum system 302 through a vacuum port connection 304 which includes a vacuum seal 305. The combination vacuum gauge 165 is thus field replaceable in the event that the combination vacuum gauge 165 malfunctions or fails.

In operation of the combination vacuum gauge system 100, a power supply and emission control block 325 provides voltage to the grid and power to the filament of the ionization gauge 110 and controls the amount of filament emission current through a feedback mechanism. The collector current of the ionization gauge 110 is provided as an input to an electrometer amplifier 330.

A sensor heat control 335 controls the power input to the heat-loss sensor 120. The heat-loss sensor 120 provides voltage and current measurements as inputs to amplifiers 340a and 340b.

Finally, a regulated bridge power source 345 provides power to the differential diaphragm sensor 130. A voltage measurement output from the differential diaphragm sensor 130 is input to a differential amplifier 355.

Each of the amplifiers 330, 340a, 340b, and 355 provides measurement signals from the combination vacuum gauge 165 to a multiplexer 365. Outputs from the multiplexer 365 are converted into digital form via an analog to digital converter 390. These digital signals are then input to a microcontroller (CPU) 380 for processing.

A CPU EEPROM 370 connects to the CPU 380 to store, in particular, calibration parameters unique to the controller electronics 160. By having separate calibration parameters for the combination vacuum gauge 165 and the controller electronics 160, the combination vacuum gauge 165 and the controller electronics 160 are interchangeable (i.e., any combination vacuum gauge 165 may be connected to any controller electronics 160). Furthermore, the controller electronics 160 may be calibrated independently of the combination vacuum gauges 165.

The barometric pressure sensor 187 also connects to the CPU 380 to provide the CPU 380 with absolute atmospheric pressure data necessary to calculate absolute and differential pressure indications over a wide range.

The CPU 380 calculates absolute and differential pressure in the vacuum system 302 based on data output from the combination vacuum gauge 165. Specifically, the ionization gauge 110 collector current is converted by the CPU 380 into an absolute ultrahigh vacuum reading using calibration parameters stored in the gauge EEPROM 140. The heat-loss sensor's 120 voltage and current data are converted by the CPU 380 into an absolute high vacuum reading using the temperature compensating calibration parameters stored in the gauge EEPROM 140. The differential diaphragm sensor 130 voltage output is converted by the CPU 380 into a differential low vacuum reading using the calibration parameters stored in the gauge EEPROM 140. This differential low vacuum reading may then be converted to an absolute pressure indication by combining the differential low vacuum reading with the absolute atmospheric pressure reading of the barometric pressure sensor 187.

In order to convert the differential diaphragm sensor 130 reading to an absolute pressure reading, the zero offset value of the differential diaphragm sensor 130 must first be removed. This is accomplished by subtracting the residual output of the differential diaphragm sensor 130 when the vacuum system is open to atmosphere. Thus, the equation for obtaining an absolute pressure reading takes the following form:

$$P_{abs} = P_{barometric} + K(P_{diff} - A) \quad (1)$$

where $P_{barometric}$=data output from the barometric pressure sensor 187 (calibrated knowing actual absolute atmospheric pressure);

$P_{diff}$=data output from the differential diaphragm sensor 130;

A=zero offset error of the differential diaphragm sensor 130, i.e., the residual output from the differential diaphragm sensor 130 when the vacuum system is open to atmosphere; and K=calibrated gain.

The appropriate calibrated gain is determined by driving $P_{abs}$ to 0 and solving for K. Thus, the calibrated gain K may be determined according to the following equation:

$$K = -P_{barometric}/(P_{diff} - A) \text{ at vacuum } (P_{abs} = \sim 0) \quad (2)$$

The heat-loss sensor 120 may be used to detect when the absolute pressure indication is well below 1 Torr, which is effectively 0 for the differential diaphragm sensor 130. Then, the gain is adjusted according to equation (2) after inserting appropriate values for A, $P_{diff}$, and $P_{barometric}$. Thus, the differential diaphragm sensor 130 reading may be converted to a calibrated absolute reading by inserting into equation (1) the zero offset value (A), the calibrated gain (K), and the readings from the differential diaphragm sensor 130 and the barometric pressure sensor 187.

Depending on the pressure in the vacuum system 302, the CPU 380 generates absolute and differential pressure readings by selecting the absolute pressure reading from the appropriate sensor and computing a differential pressure reading from the absolute pressure readings. In an overlap region where two sensors have overlapping pressure indication ranges, the differential and absolute pressure readings are combined to provide a smooth transition between the pressure readings of the two sensors. As a result, the combination vacuum gauge according to the present invention provides both differential and absolute pressure readings over three ranges using only three gauges exposed to the measurement region and a simple barometric pressure sensor exposed to the ambient atmosphere.

When the pressure in the vacuum system 302 goes into or out of the vacuum range of the ionization gauge 110, the CPU 380 sends a signal 360 to the power supply and emission control block 325 to turn the ionization gauge 110 on or off.

Figure 4:
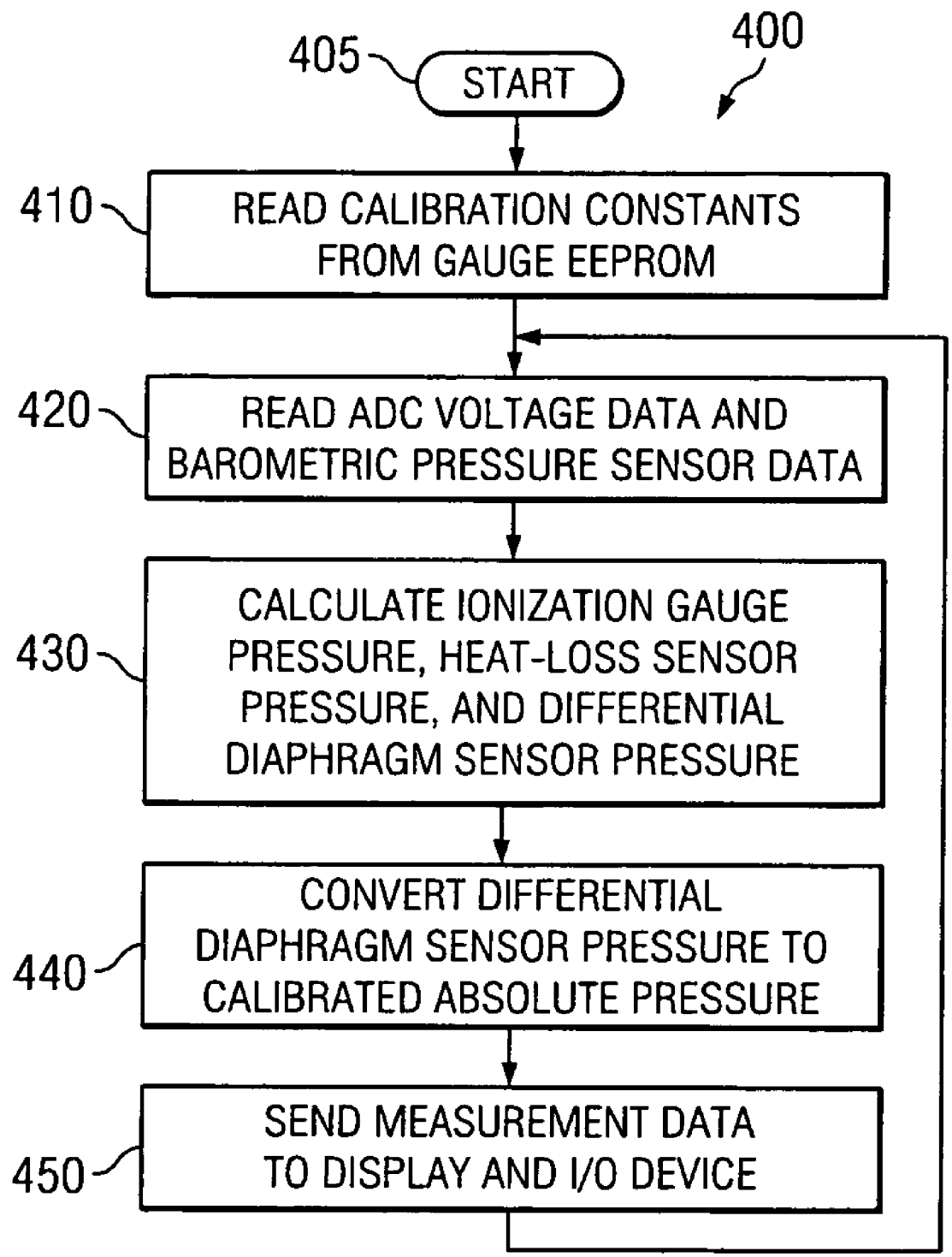
FIG. 4 is a flow chart illustrating the operation of the combination vacuum gauge system.

Referring to FIG. 4, a process 400, implemented by computer instructions executed on the CPU 380 of FIG. 3, converts raw sensor data (e.g. volts, amps, serial data) into vacuum data to be displayed on a pressure display 395 and to be output to an external device via input/output circuitry 350 and a user interface connector 399 of FIG. 3.

The process for measuring absolute and differential pressure in a vacuum system 400 begins in step 405. In step 410, the CPU 380 reads the calibration parameters for the vacuum sensors, including the temperature compensating calibration parameters for the heat-loss sensor, from the gauge EEPROM 140. In step 420, the CPU 380 reads the analog to digital converter data signals 385 for the three sensors 110, 120 and 130 (FIG. 3) and the barometric pressure sensor data. In step 430, the CPU 380 calculates the ionization gauge pressure, the heat-loss sensor pressure, and the differential diaphragm sensor pressure. In step 440, the CPU 380 converts the differential diaphragm sensor pressure to calibrated absolute pressure according to equation (2). In step 450, the measurement data is sent to a display and to an input/output device and the process returns to step 420.

While this invention has been particularly shown and described with references to preferred embodiments thereof, it will be understood by those skilled in the art that various changes in form and details may be made therein without departing from the scope of the invention encompassed by the appended claims.

What is claimed is:

1. An apparatus for measuring gas pressure in a measurement region comprising:
   an absolute high vacuum gauge;
   a differential low vacuum gauge providing a differential relative to ambient pressure;
   a barometric absolute pressure sensor, the barometric absolute pressure sensor being exposed only to the ambient atmosphere outside the measurement region; and
   a processor coupled to the absolute high vacuum gauge, the differential low vacuum gauge, and the barometric absolute pressure gauge, the processor providing absolute gas pressure indications in the ranges of high and low vacuum and differential gas pressure indications at low vacuum.

2. The apparatus according to claim 1, wherein the absolute high vacuum gauge is a heat-loss sensor.

3. The apparatus according to claim 1, further comprising an absolute ultrahigh vacuum gauge.

4. The apparatus according to claim 3, wherein the absolute ultrahigh vacuum gauge is an ionization gauge.

5. The apparatus according to claim 1, wherein the processor converts data output from the differential vacuum gauge from an uncalibrated differential pressure indication to a calibrated absolute pressure indication.

6. The apparatus according to claim 5, wherein the processor converts data output from the differential vacuum gauge from an uncalibrated differential pressure indication to a calibrated absolute pressure indication according to the following formula:

$$P_{abs} = P_{barometric} + K(P_{diff} - A) \text{ where}$$

$P_{barometric}$=data output from the barometric absolute pressure sensor (calibrated knowing actual absolute ambient pressure);

$P_{diff}$=data output from the differential low vacuum gauge;

A=zero offset error of the differential low vacuum gauge; and $$K = -P_{barometric}/(P_{diff} - A) \text{ at vacuum } (P_{abs} = \sim 0).$$

7. The apparatus according to claim 1, wherein the differential low vacuum gauge is a diaphragm sensor.

8. The apparatus according to claim 1, wherein the data output from absolute high vacuum gauge and the differential low vacuum gauge overlap.

9. A method for measuring gas pressure in a measurement region comprising the step of:
   providing an absolute high vacuum gauge;
   providing a differential low vacuum gauge providing a differential relative to ambient pressure;
   providing a barometric absolute pressure sensor, the barometric absolute pressure sensor being exposed only to the ambient atmosphere outside the measurement region; and providing absolute gas pressure indications in the ranges of high and low vacuum and differential gas pressure indications at low vacuum based on data output from the absolute high vacuum gauge, the differential low vacuum gauge, and the barometric absolute pressure sensor.

10. The method according to claim 9, wherein the absolute high vacuum gauge is a heat-loss sensor.

11. The method according to claim 9, further comprising an absolute ultrahigh vacuum gauge.

12. The method according to claim 11, wherein the absolute ultra high vacuum gauge is an ionization gauge.

13. The method according to claim 9, further comprising the step of converting data output from the differential vacuum gauge from an uncalibrated differential pressure indication to a calibrated absolute pressure indication.

14. The method according to claim 13, wherein the step of converting data output from the differential vacuum gauge from an uncalibrated differential pressure indication to a calibrated absolute pressure indication includes evaluating the following formula:

$$P_{abs} = P_{barometric} + K(P_{diff} - A) \text{ where}$$

$P_{barometric}$ = data output from the barometric absolute pressure sensor (calibrated knowing actual absolute ambient pressure);

$P_{diff}$ = data output from the differential low vacuum gauge;

A = zero offset error of the differential low vacuum gauge; and $$K = -P_{barometric}/(P_{diff} - A) \text{ at vacuum } (P_{abs} = \sim 0).$$

15. The method according to claim 9, wherein the differential low vacuum gauge is a diaphragm sensor.

16. The method according to claim 9, wherein the data output from absolute high vacuum gauge and the differential low vacuum gauge overlap.

17. An apparatus for measuring gas pressure in a measurement region comprising:

an absolute high vacuum gauge;

a differential low vacuum gauge providing a differential relative to ambient pressure;

a barometric absolute pressure sensor, the barometric absolute pressure sensor being exposed only to the ambient atmosphere outside the measurement region; and means for providing absolute gas pressure indications in the ranges of high and low vacuum and differential gas pressure indications at low vacuum based on data output from the absolute high vacuum gauge, the differential low vacuum gauge, and the barometric absolute pressure sensor.

* * * * *